United States Patent [19]
Owen

[11] 3,850,437
[45] Nov. 26, 1974

[54] LEVELING SYSTEM WITH A SINGLE OFFSET MOUNTED AIR SPRING
[75] Inventor: Robert E. Owen, Grand Blanc, Mich.
[73] Assignee: General Motors Corporation, Detroit, Mich.
[22] Filed: Nov. 17, 1972
[21] Appl. No.: 307,378

[52] U.S. Cl. ........ 280/6 R, 280/124 F, 280/DIG. 1, 267/65 B
[51] Int. Cl. ............................................. B60g 17/00
[58] Field of Search............ 180/70 X, 71, 72, 73 R; 280/124 F, 6 H, 6 R, DIG. 1; 267/65 A, 65 B, 65 R

[56] References Cited
UNITED STATES PATENTS
2,856,199  10/1958  Walker ........................ 280/DIG. 1
2,981,551  4/1961   Dolza ............................ 280/124 F
3,043,582  7/1962   Hirtreiter ........................ 267/65 B
3,558,156  1/1971   Jackson et al. ................. 280/124 F
3,671,150  6/1972   Jackson et al. ................. 60/54.5 R Primary Examiner—Kenneth H. Betts
Assistant Examiner—Jack D. Rubenstein
Attorney, Agent, or Firm—J. C. Evans

[57] ABSTRACT

In preferred form, a vehicle leveling system having a center mounted leveling spring off center of a frame cross member urged against a shelf support on a differential housing on which is supported a compressor driven by the differential pinion to supply air to the spring for producing an uplifting force supplemental to that of a pair of primary springs carried between the same cross member and the vehicle axle housing.

7 Claims, 7 Drawing Figures

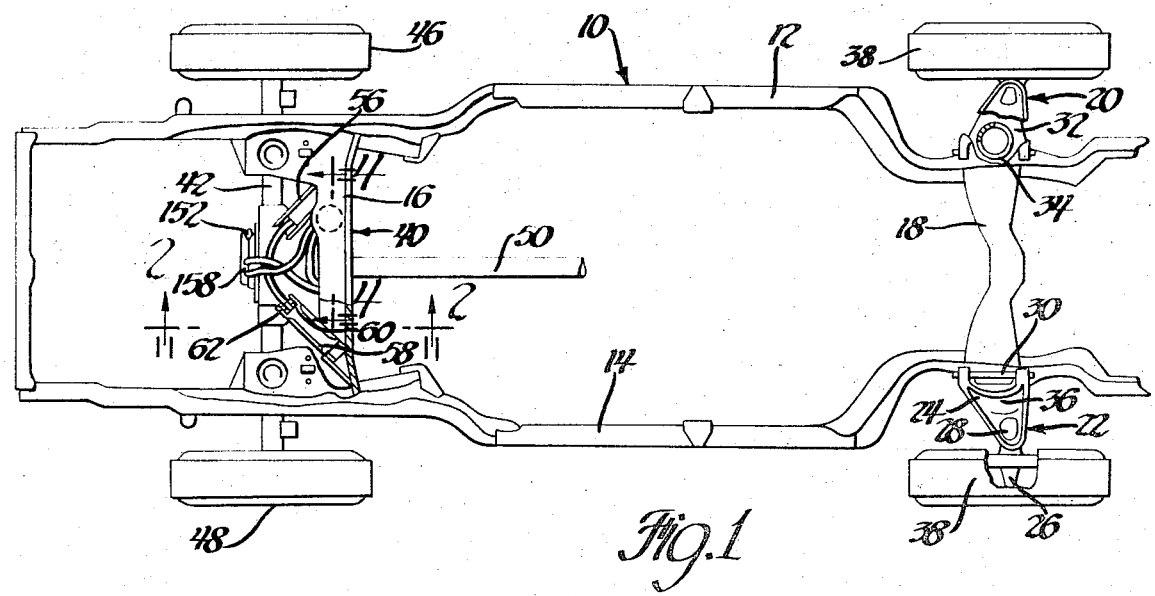

LEVELING SYSTEM WITH A SINGLE OFFSET MOUNTED AIR SPRING

This invention relates to vehicle leveling systems and more particularly to systems for producing a supplemental load-carrying lift action at the rear suspension of a vehicle for leveling the frame of the vehicle with respect to ground engaging suspension components.

Vehicle leveling systems are known which use pressurizable spring components in the rear suspension system which are selectively pressurizable in response to changes in load on the vehicle to produce a variable load support effect which supplements that of primary suspension springs in accordance with load changes so as to level the frame of the vehicle with respect to ground engaging components of the suspension.

In typical rear suspension systems, these spring components have taken the form of pressurizable air chambers on shock absorber units which are located in a standard shock absorber position between the axle housing of the vehicle and the frame of the vehicle. The advantage of such systems is that they require little or no modification to existing suspension frame and axle housing configurations. Moreover, they are especially suited for use in standard suspensions of the type having a pair of lower control arms each pivotally connected between the ends of the axle housings and spaced longitudinal side members of the vehicle frame and a pair of upper control arms each pivotally connected between a midpoint of the axle housing and a frame cross member located between each of the side members at a point above and slightly forward of the axle housing.

In such systems, the pressurizable chamber of the air springs on the shock absorber can cause the seals of the shock absorber to be maintained under an increased pressure. This will increase static friction of the sliding seals of the shock absorber units between the vehicle frame and the axle housing.

Furthermore, in such arrangements it is necessary to include two air spring components, one on each of the shock absorbers, to produce a balanced uplifting force between the ground engaging suspension components and the frame at the rear suspension of the vehicle.

Accordingly, an object of the present invention is to reduce the number of pressurizable air chambers in a leveling system for a vehicle suspension by the provision of a single, center mounted air spring located between the ground engaging components of the rear suspension of a vehicle and the frame portion thereof and wherein the air spring is configured to freely follow vehicle suspension movements.

A further object of the present invention is to provide a vehicle leveling system for a rear suspension of a vehicle having all components of the leveling system located in the rear suspension in close proximity to one another thereby to reduce the need for substantial lengths of fluid conduits for connecting an air spring components at the rear of the vehicle with air supply means at the front of the vehicle.

Still another object of the present invention is to provide an improved vehicle leveling system at the rear suspension of a vehicle including a single pressurizable air spring component which is located between a support on the differential housing on the vehicle and a cross frame member so as to push down against the nose of the differential in a manner to permit shortening of the pinion bumper of the vehicle thereby to improve the vehicle ride by reducing the tendency of the pinion bump stop of the vehicle to strike the differential housing as the vehicle passes over a bumpy surface.

Still another object of the present invention is to reduce static friction in vehicle leveling units by the provision of a single air spring having a pair of spaced apart piston members thereon interconnected by a single sleeve having a rolling lobe at each end thereof connected respectively to one of the pistons so as to define a column having a length greater than the diameter of the column that reduces lateral stiffness of the leveling air spring component between the axle housing and the frame member while producing an uplifting effect along a column axis between the pistons throughout the full range of pressures within the air spring produced by a leveling system control for varying the amount of air pressure in the air spring and throughout the full range of rebound and compression travel of the sprung and unsprung mass portions of the rear suspension of a vehicle.

Still another object of the present invention is to provide a durable vehicle leveling system for producing a supplemental load support action at the rear suspension of the vehicle including a single spring component for leveling the vehicle and simplified means for supplying air to and exhausting air from the air spring unit, all of which are mounted within th confines of the rear suspension of the vehicle.

In one working embodiment of the invention, these and other objects are attained in a four-link type of rear suspension system including an axle housing having a pair of spring seats on either end thereof, each of which support one end of a coil spring. The opposite end of each of the coil springs is supported on a spring seat located on a rearwardly directed portion of a frame cross member connected between two side members of the vehicle frame. The four link suspension includes a pair of lower control arms each pivotally connected between one of the opposite side frame members and a bracket on one side of the axle housing. Additionally, the four-link suspension includes a pair of upper control arms each pivotally connected to brackets on the axle housing adjacent the differential of the vehicle and to the cross frame member adjacent the ends thereof. In such systems, the control arms will produce a controlled suspension movement between the vehicle frame and the axle housing. The leveling system further comprises a double diaphragm tubular air spring fastened through tapered pistons, one of which is located on a forwardly directed seat portion of the cross frame member and the other of which is supported by the differential housing at a point adjacent the forward nose of the differential housing. An air compressor is supported on the differential housing and includes a pump piston operated by a pinion located within the differential housing to produce reciprocating movement that draws air from atmosphere and directs it under pressure into the air spring. The air spring has a pressurizable chamber between the pistons and the double diaphragm tubular air spring component which receives air from the compressor to produce a resultant force between the pistons in accordance with the amount of pressure in the chamber. This will produce a variable supplemental load carrying action which will assist that of the primary coil springs of the vehicle suspension so as to maintain the frame of the vehicle at a desired height relationship with respect to the axle housing. The air supply to and from the chambers are under the control of a valving component which is located in one of the air pistons and is operated in part by a rolling lobe portion of the tubular air sleeve of the spring to control exhaust flow from the chamber in accordance with the height relationship between the vehicle frame and the axle housing.

The sleeve of the air spring has nylon cores therein for reinforcing an elastomeric compound which enables the sleeve to flex. The cords are arranged in a cross pattern which will cause the sleeve to contract in length a predetermined amount as the pressure within the air spring increases. This causes a slight foreshortening of the length of the sleeve as the supplemental resultant force increases within the air spring unit. The slight foreshortening is of a magnitude which will compensate for increased compression of primary spring components at the front of the vehicle by foreshortening the sleeve to compensate for front suspension deflection thus keeping headlight air and rear vision generally parallel to ground.

In the preferred embodiment the tubular air sleeve is selected to have a length substantially greater than the diameter of the sleeve. Further, the provision of a pair of piston members in the air sleeve permits the air spring component of the leveling system to follow suspension motions between the frame of the vehicle and the axis housing without placing undue strain on the air spring components. Furthermore, the provision of a pair of pistons enables the air spring sleeve to adjust to changes in the relative position between the frame mounted piston thereof and the differential housing mounted piston thereon to maintain a resultant columnar force between the pistons throughout the leveling range and the full range of compression and rebound movements of the frame with respect to the axle housing.

Further objects and advantages of the present invention will be apparent from the following description, reference being had to the accompanying drawings wherein a preferred embodiment of the present invention is clearly shown.

In the drawings:

FIG. 1 is a view in top elevation of a vehicle frame including a four link rear suspension having the present invention;

FIG. 2 is a vertical section view taken along the line 2—2 of FIG. 1;

FIG. 3 is a vertical sectional view taken along the line 3—3 of FIG. 2;

Figure 4:
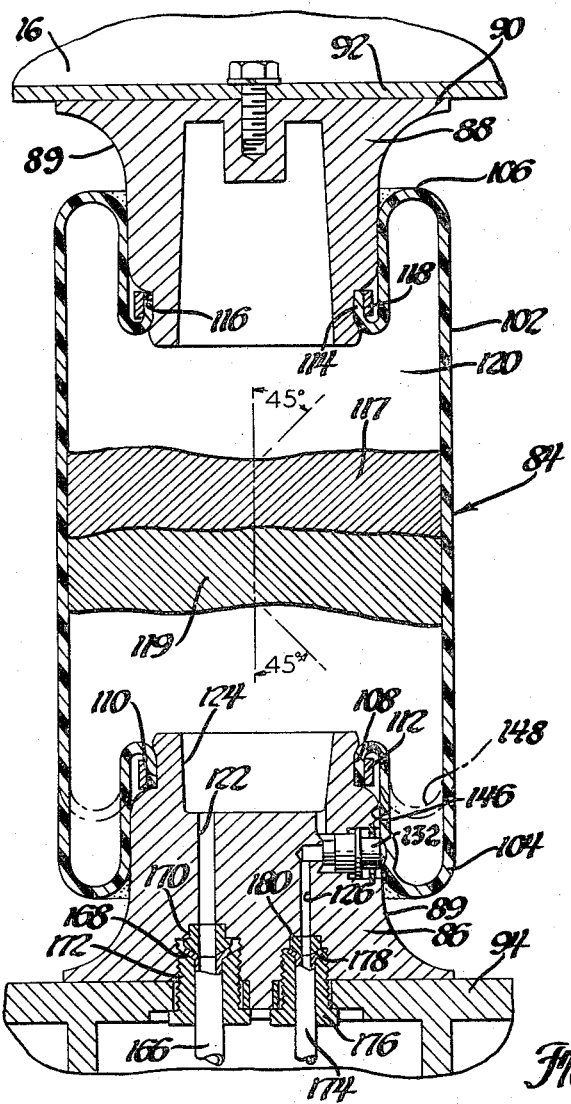
FIG. 4 is an enlarged sectional view taken along the line 4—4 of FIG. 1 showing the air spring component of the present invention.
Figure 5:
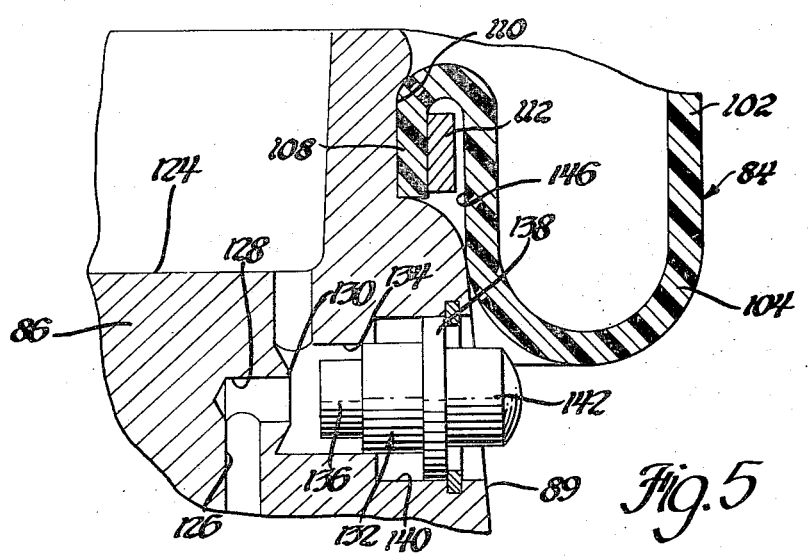
FIG. 5 is an enlarged fragmentary sectional view of a valving component located in one of the pistons of FIG. 4.

Referring now to the drawings, in FIG. 1 a vehicle frame 10 is illustrated having a pair of spaced apart longitudinally directed side frame members 12, 14 on either side thereof.

Near the rear of the frame 10, the members 12, 14 are connected by a frame cross member 16. At the front of the frame a cross member 18 connects the two side frames. In the illustrated arrangement the frame 10 is supported at the front end thereof by standard independent front wheel suspension assemblies 20, 22. Each of the suspension systems are standard assemblies. They are of the independent type including an upper control arm 24 connected at one end thereof to a steering knuckle 26 by means of an upper ball joint connector means 28 and to the opposite end thereof by means of an upper control arm connector assembly 30 to the side frame member 14 at the front thereof. A lower control arm 32, partially shown in the assembly 20, has the outboard end thereof connected to the lower portion of the steering knuckle and is pivotally connected at the opposite end thereof to the cross frame member. The arm 32 defines a seat for a coil spring 34 which is supported at the opposite end thereof on a spring seat surface 36 formed on the underside of each of the side frame members overlying the springs 34. Each of the front suspension assemblies 20, 22 includes a ground engaging wheel assembly 38.

The front independent suspension assemblies 20, 22 each respond to changes in the loading on the frame 10 by compression of the coil springs 34 to cause the front end of the frame 10 to be lowered in predetermined amount when added passengers or luggage are placed on the frame of the vehicle.

The cross members 16 at the rear of the frame 10 form part of a rear suspension assembly 40. The cross frame member 16 thereof constitutes one part of the sprung portion of the suspension.

The unsprung mass portion of the suspension includes a rear axle housing 42 enclosing an axle 44 which is connected at opposite ends thereof to ground engaging wheel assemblies 46, 48.

Drive to the wheels is provided through a propeller shaft 50 from the power train of the engine, not shown. The propeller shaft 50 is connected to a differential pinion 52 passing through a differential housing 54 located midway of the axle housing 42.

The rear suspension assembly 40 includes a four arm linkage system including an upper pair of control arms 56, 58 each of which is pivotally connected by means including a pin 60 to a bracket 62 on the differential housing 54. The opposite ends of each of the control arms 56, 58 are pivotally connected to a bracket 64 depending downwardly at each side of the cross member 16.

The four linkage control system further includes a pair of lower control arms 66, 68 each of which has the forward end thereof pivotally connected to one of the frame members by a pivot connector means not shown and having the opposite end thereof pivotally connected by means 71 to a bracket 72 on the end of the axle housing 42.

The upper and lower control arms permit relative suspension movement between the vehicle frame 10 and the axle housing 42. In particular, it will allow for motions therebetween including lateral, tramp, windup and fore and aft motions of of the rear suspension 40.

In the illustrated arrangement, the primary vehicle load supported by the rear suspension 40 is assumed by a pair of rear coil spring members 74, 76. Each of the rear coil spring members is supported on a spring seat 78 formed in a rearwardly directed integral ledge 80 formed on each side of the rear cross arm 16 of frame 10. The opposite or lower end of each of the coil springs 74, 76 is supportingly received on a spring bracket 82 formed on each end of the axle housing 42. The coil springs 74, 76 support the vehicle chassis load without passenger and trunk loads at a predetermined trim height. Shock absorbers are included in the suspension in a conventional manner, one of which is partially illustrated at 81. The system maintains the vehicle chassis at a trim height slightly below a normal curb height relationship of a vehicle without the improved leveling system. The system, as in cases where air springs are mounted on the shock absorber to level a vehicle, has the feature of permitting the basic vehicle load as well as passenger and trunk loads to be carried in cases where the air spring component of the system to be described becomes inoperative.

In accordance with certain principles of the present invention, only a single air spring assembly 84 is required to level the vehicle frame 10 in response to changes in load thereon. More particularly, in the illustrated arrangement the air spring assembly 84 is comprised of a pair of spaced apart piston members 86, 88. Each of the piston members has a bell-shaped outer surface 89 increasing to an enlarged diameter at its base. The upper piston member 88 includes a base portion 90 thereon connected to a spring seat 92 formed as a forwardly directed portion of the cross member 16 at a point slightly offset from the midpoint thereof and slightly inclined downwardly in a forward direction as best seen in FIGS. 1 and 2. The offset location is compensated by selecting the rate of spring 74 to be slightly less than the rate of spring 76. This balances the spring support of cross member 16 to prevent tilt from one end to the other end thereof. The forwardly located spring seat 92 overlies a support flange 94 formed as a side shelf on the left side of the differential housing 54 as best shown in FIG. 3. The piston 86 is secured to flange 94 by suitable fastening means representatively shown as a threaded stud 95. The differential housing 54 includes a pinion bumper stop surface 96 formed along a line colinear of the axis of the propeller shaft 50 and the longitudinal axis of the differential housing 54. It underlies a pinion bumper 98 of resilient energy absorbing material carried by a flange portion 100 of the cross member 16 at the midpoint thereof.

The pinion bumper 98 is adapted to engage the pinion stop upon severe impact movements between the frame 10 and the axle housing that might otherwise cause impact of the frame 10 with the differential housing 54 in the vicinity of the stop surface 96.

The air spring assembly 84 pushes down on the nose of the differential housing 54 to maintain a predetermined height relationship therebetween. This permits shortening of the length of the bumper 98 without reducing its capability of snubbing the vertical excursions between the vehicle frame 10 and the differential housing 54 which might otherwise cause impact therebetween. The fact that the pistons 86, 88 are bell-shaped produces a rapid, large magnitude increase in spring rate when the spring 84 is completely compressed. In certain cases, it is contemplated that this snubbing action will eliminate the need for a bumper 98.

The aforedescribed arrangement for supporting the pistons of the air spring assembly 84 affords a substantial available space for the air spring enabling it to be large enough to permit a spring stiffness therein which can increase in proportion to load thus maintaining the vehicle frame 10 in a flatter disposition with respect to the suspension components throughout the leveling operation. Furthermore, the arrangement is attained without substantial modifications of a conventional rear suspension assembly.

Another feature of the present invention is the general configuration of the air assembly 84. The leveling spring 84 more particularly includes a tubular sleeve of nylon cord reinforced elastomeric neoprene material having a length greater than the diameter thereof. The sleeve is tapered inwardly at each end thereof to form rolling lobes 104, 106 on each end of the tubular sleeve 102. The taper holds the roll in the lobe rolled under conditions where the spring is fully extended when wheels are jacked up for tire repair. The roll also is maintained when the spring is deflated. The fact that the roll is continuously maintained assures that the sleeve will fold onto the pistons. This prevents buckling. The lobe 104 has an end 108 thereon fit over an annular surface 110 on the inner end of the piston 86. A clamp ring 112 secures the end 108 in sealing engagement with the surface 110. The rolling lobe 106 has an end 114 thereon in engagement with an annular surface 116 on the inner end of the piston 88. A ring 118 surrounds the end 114 to hold it in sealing engagement with the surface 116.

As a conventional car is loaded from curb to gross vehicle weight, half the front seat load goes to the front and half to the rear. In a like fashion, in our current cars, 20 percent of the rear passengers are carried on the front suspension and 80 percent is on the rear. The trunk load removes load from the front wheels and adds about 130 percent of the trunk load to the rear suspension. Loading a car to six passenger load drops the front end a little over an inch. Cord angles are adjusted in a cross plyed sleeve as shown at 117 and 119 in FIG. 4 to an angle of 45° when the sleeve is below 15 psi with this arrangement a condition is reached under many load conditions where diametral growth of sleeve 102 will cause the cords to cross at greater angles to foreshorten the elastic spring to match front suspension deflection, thus keeping headlight aim and rear mirror vision parallel to ground. At gross vehicle load it has been observed that one inch of front suspension deflection is compensated by foreshortening of the spring assembly from a length of 9 ⅞ inches at curb weight to a length of 8 ¾ length at the gross vehicle weight condition to approximate the front suspension compression drop.

The sleeve 102 along with the pistons 86, 88 define an enclosed pressurizable air chamber 120.

Air supply to and from the chamber 120 is through the piston 86. More particularly, the piston 86 includes an inlet passageway 122 formed through the piston 86 from the base into communication with an inlet recess 124 in the inner end of the piston 86 which is in direct communication with the pressurizable air chamber 120.

The piston 86 further includes an exhaust passageway 126 extending through the piston 86 from the inlet recess 124 through the base thereof. The exhaust passageway 126 has an offset bore 128 therein which defines a valve control seat 130 intermediate the length of the passageway 126. A valve member 132 is slidably supported in a bore 134 arranged colinear of the bore 128. It includes a valving element 136 on the end thereof which is selectively moved into open and closed relationship with respect to the seat 130 in accordance with the height relationship between the vehicle frame 10 and the unsprung mass portion of the vehicle suspension in part represented by the axle housing 42.

The valve 132 includes an annular shoulder 138 thereon slidably supported in an outer bore 140 to guide the valving element 136 with respect to the valve seat 130. The valve has a plunger 142 extending outwardly of the bell-shaped conical surface on the outer surface of the piston 86 which is tapered to produce a variable spring rate. The plunger 142 is thus located in operative relationship with an inner surface 146 on the lobe 104. The inner surface 146 rolls onto and off of the surface 89 in accordance with the height relationship between the frame 10 and the axle housing 42. For example, when the vehicle is slightly loaded, the primary springs 74, 76 will raise the frame 10 above the axle housing 54 to a point where the lobe 104 will assume the dotted line position shown at 148 in FIG. 4. At this point, the surface 146 of the lobe 104 is located out of engagement with the plunger 142 and the valve 132 will move outwardly of the bore 104 thereby causing the valving element 136 to move from the seat 130 to open the exhaust passageway 126 thus to reduce the air pressure within the pressurizable air chamber 120.

When the vehicle is heavily loaded, the frame 10 will compress the primary springs 74, 76 and move the frame 10 closer to the axle housing 42. This will cause the inner surface 146 of the lobe 104 to assume the solid line position shown in FIG. 4. At this point, it presses against the plunger 142 to move the valving element 136 against the seat 130 to trap pressure within the chamber 120.

In the illustrated arrangement, the air spring 84 forms part of a fluid system including an air supply pump 150. Air supply to the pump is through a fluid circuit including an air inlet 152 on one end of a horseshoe shaped dessicant tank 154 which is supportingly received on the end surface 156 of the differential housing 54. The dessicant chamber includes a fitting 158 connected to an inlet line 160 in turn connected to the inlet 162 of the air compressor 150. The air compressor has an outlet 164 thereon which is connected to a pressure line 166 having the opposite end thereof connected in fluid communication with the air spring inlet passageway 122. More particularly, the pressure line 166 has an outwardly flared end 168 thereon located in sealing engagement with the upper end of a sealing grommet 170 supported within a counterbore portion of the inlet passageway 122. The flared end 168 is held in sealing relationship with the grommet 170 by means of a threaded fitting 172 that has one end thereof fit over the line 166 in the opposite end thereof threadably received in the base 90 of the air spring piston 88 so as to engage the upper surface of the outwardly flared end 168.

The fluid system further includes an exhaust line 174 which is connected to the piston 88 by means of a threaded fitting 176. It is threadably received within the base to bear against an outwardly flared end 178 of the line 174 to hold it against the nose of a sealing grommet 180 fit in a counterbore section of the exhaust passageway 126. The line 174 is connected to a fitting 158 in the dessicant tank 154 so as to communicate the pressurizable chamber 120 of the spring 84 with line 160 during operation of the vehicle.

Compressor 150 is directly driven by a cam 180 on the differential pinion 52 as best shown in FIG. 3. The cam 180 reciprocates a piston 182 into and out of an oil-filled chamber 184. The piston 182 is slidably supported for reciprocation within a cylinder 186 which defines the oil-filled chamber 184. It is biased against the cam 180 by means of a return spring 188 which bears against a perforated stop plate 190. The perforated stop plate supports a diaphragm 192 which is oscillated by reciprocation of the piston 182 during compressor operation, so as to draw air from the inlet 162 for discharge through the outlet 164. The compressor includes an oil intake valve 194 and an oil exhaust valve 196 both in communication with an oil sump 198. Oil is drawn from the sump 198 and returned thereto upon reciprocation of the piston 182 to vary the volume of oil within the chamber 184 to cause the oscillating action of the diaphragm 192.

Details of a cam operated pump of this type are set forth in the U.S. Pat. No. 3,671,150, issued June 20, 1972 to G. W. Jackson. The details themselves form no part of the present invention, it being understood that other type compressors can be operated by the pinion mounted cam 180 from a point directly supported by the differential housing 54. The advantage of the present invention is that the air supply is located at the rear suspension of the vehicle eliminating the need for substantial lengths of supply conduits running from air compressor sources within the engine compartment of a vehicle to the rear thereof. The present arrangement enables the whole leveling system to be located within the confines of the rear suspension 40 of a vehicle without any substantial modification of standard components of conventional four-linkage suspension systems.

Figure 6:
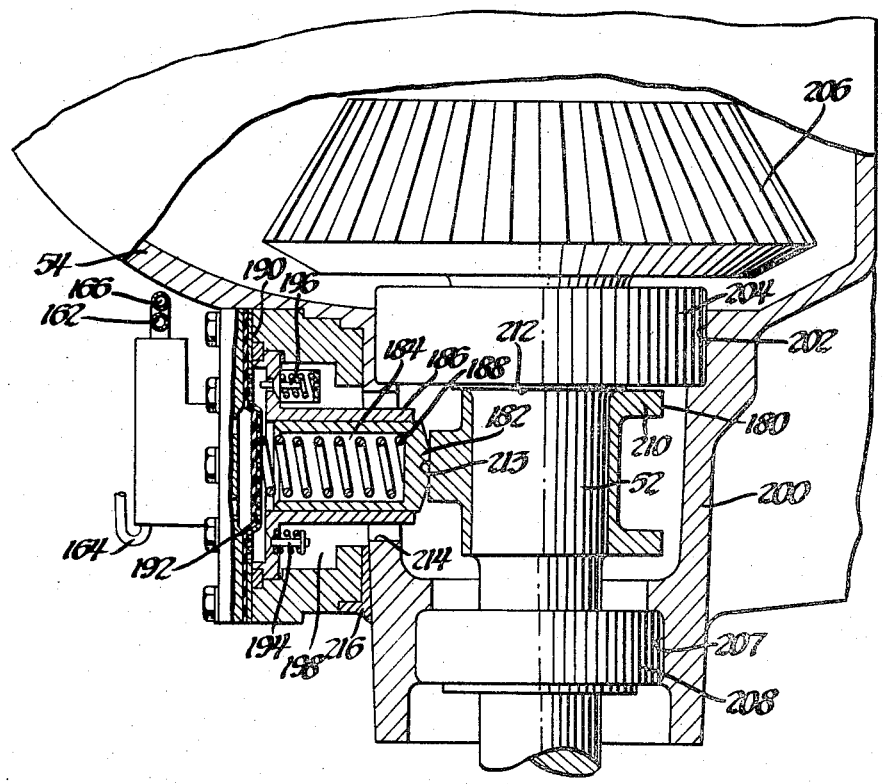
FIG. 6 is an enlarged fragmentary sectional view taken along line 6—6 of FIG. 3 looking in the direction of the arrows.

In FIG. 6 the differential housing is shown as including a tubular extension 200 which forms the sump 198. The extension 200 has the first bearing surface 202 formed thereon which supportingly receives a first differential pinion assembly 204 immediately outboard of the bevel gear 206 of the differential. It further includes a bearing surface 207 that supports a second bearing assembly 208 located on the end of the extension 200. The bearing assemblies 204, 208 support the pinion 52. The cam 180 includes a flange 210 thereon axially located against a shoulder 212 on the pinion 52. The cam has an outer surface 213 thereon which has a contour in accordance with the following schedule to produce the reciprocation of the piston set forth above.

INLET & EXHAUST CAM CONTOUR

| ANGLE | DISPLACEMENT |
|---|---|
| 0° | 0.0000 |
| 10° | 0.0029 |
| 20° | 0.0115 |
| 30° | 0.0255 |
| 40° | 0.0445 |
| 50° | 0.0675 |
| 60° | 0.0944 |
| 70° | 0.1236 |
| 80° | 0.1546 |
| 90° | 0.1866 |
| 100° | 0.2169 |
| 110° | 0.2461 |
| 120° | 0.2730 |
| 130° | 0.2959 |
| 140° | 0.3148 |
| 150° | 0.3287 |

INLET & EXHAUST CAM CONTOUR-Continued

| ANGLE | DISPLACEMENT |
|---|---|
| 160° | 0.3371 |
| 170° | 0.3400 |

Figure 7:
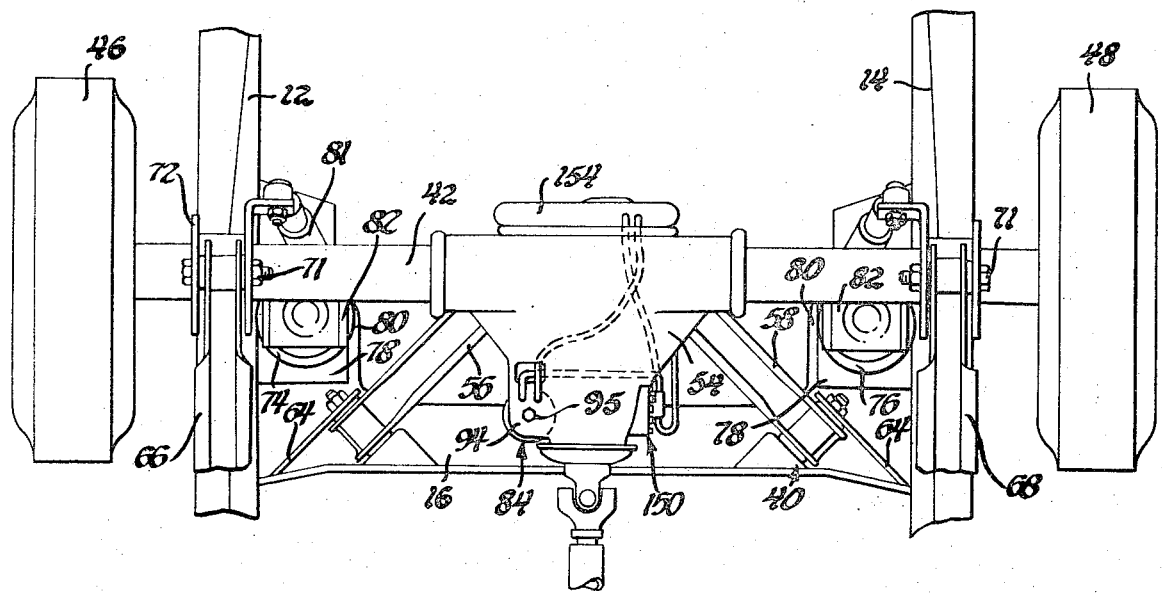
FIG. 7 is an enlarged bottom elevational view of a rear suspension including the present invention.

As best shown in FIGS. 6 and 7, the compressor is securely attached to the differential housing 54 adjacent a side port 214 by means including a brazed connector section 216. The pressure conduit 166 thus has a short reach across the bottom of the nose of the differential housing 54 for connection to the inlet passageway 122 of the air spring 84. The exhaust conduit 174 runs from the exhaust passageway 126 of the air spring assembly 84 over the top of the axle housing to a point where it is connected to the fitting 158.

In operation, the differential mounted compressor 150 only pumps when the car is moving and only then will the air spring be inflated to the pressure required to lift the rear of the car to a predetermined position.

In one working embodiment of the invention, the system is maintained at a predetermined height relationship one inch below a normal curve height of the same car without the leveling system. In the arrangement, the primary springs 74, 76 hold up the dead weight of the vehicle and only passenger and trunk loads are carried on the air spring 84.

Each time the car is loaded, air is taken through the dessicant tank 154 to absorb any moisture that may be in it so that the spring and valves function with respect to dry air. Recirculation of the air through the compressor 150 warms the air. During driving and any time the car is unloaded, the warm air is allowed to escape through the tank 154 to dry the dessicant therein. It has been found that in this system the air spring 84 will push down on the differential nose and will improve the ride. Steering and handling at maximum vehicle weight is improved over production arrangements wherein air springs that provide supplemental force are located in the vicinity of the wheels of the rear suspension. Furthermore, the arrangement eliminates any static frictional sliding seals in shock absorbers having air springs to further improve ride qualities.

In the working embodiment of the invention, pressure within the air spring to lift passenger and trunk loads from the leveling system run from 12 psi at one passenger load to 60 psi at six passengers plus a 200 lb. trunk load.

The main operative components of the system have the following mechanical ratings.

| ITEM | RATING |
|---|---|
| Compressor 150 | .20 cubic inches |
| Air Spring 84 | Volume 110 cubic inches at curb weight |
| Air Sleeve 84 | Nylon reinforced neoprene material |
| Air Spring 84 Pressure | 10 – 60 psi |
| Air Spring Length with Pistons | 9⅞ inches at curb weight |
| Air Spring Diameter | 5 inches |
| Air Spring Wall Thickness | .110 inches |
| Spring 74 | 105 lbs./inch |
| Spring 76 | 115 lbs./inch |

In systems using components having the aforedescribed mechanical characteristics, the system has been found to pump up in a distance of only 1.1 miles under normal highway driving conditions at a gross vehicle weight. The system will pump up within .3 miles for a five passenger load.

While the embodiments of the present invention, as herein disclosed constitute a preferred form, it is to be understood that other forms might be adopted.

What is claimed is as follows:

1. A vehicle rear suspension leveling system comprising: a rear axle housing having wheel means on either end thereof, means on said axle housing defining a pair of spaced apart spring seats, chassis frame cross member located above said axle housing having opposite end portions thereon, a pair of spaced apart primary spring means each having a first end thereon supported on one of said spring seats and an opposite end thereon supported on one of said cross member end portions, said spring means serving to yieldably maintain said chassis cross member at a predetermined position above said axle housing under first vehicle load conditions, a differential housing on said axle housing located between the opposite ends thereof, differential gear means within said housing including a pinion member, a drive shaft extending from said differential housing adapted to be connected to power output means for driving said gear means to transfer power from the output means to said wheel assemblies, compressor means including a driven member operated by said differential pinion to compress air, a tubular air spring sleeve having upper and lower ends, said sleeve having rolling lobes at each end thereof; a piston sealed to each of said lobes including a bell-shaped outer surface for supporting each of said lobes for rolling movement with respect thereto, means connecting one of said pistons connected to said cross member at a point offset from the center of said cross member, the other of said pistons connected offset of said differential housing on side opposite to said differential pinion driven compressor, said sleeve having a length greater than its diameter to permit free, relative movement between said pistons in response to suspension movement, means to direct air from said compressor means into said air spring sleeve to vary the height thereof only when the vehicle is driven and to produce a spring force supplemental to that of said primary spring means, and means for controlling air flow from said compressor means to said air spring sleeve for automatically maintaining a predetermined height relationship between said chassis cross member and said axle housing in response to changes in vehicle load.

2. A vehicle leveling system for maintaining a predetermined height relationship between the sprung and unsprung mass portions at the rear and front of a vehicle comprising: front suspension means including a spring means for supporting the vehicle weight at the front thereof, a rear frame cross member directed generally perpendicularly to the longitudinal axis of the vehicle and including end portions thereon, side frame members connected to each of the end portions of said cross member, spaced rear spring means supporting said cross member, said cross member including a forwardly located seat portion thereon offset from the midportion of said cross member, unsprung suspension means located below said cross member including support means for said rear spring means thereon underlying said forwardly located seat portion on said cross member, a first air spring piston connected to said cross member seat portion, a second air spring piston connected to said support means, a tubular sleeve connected between each of said pistons including a rolling lobe on each end thereof supportingly received on each of said pistons, each of said rolling lobes being sealingly secured to said pistons to form a pressurizable air chamber within said sleeve between said first and second piston members, said sleeve having a length between said pistons greater than the diameter of said sleeve to define a spring column having reduced lateral stiffness whereby the spring will follow suspension motion between said cross member seat and said differential support means, said first and second pistons and said sleeve lobes supported thereon adjusting to relative movement between said cross member seat and said differential support member to maintain columnar force reactions on said pistons between said cross member, pressurizable air supply means, means for controlling flow of air from said pressurizable air supply means into said sleeve for inflating said sleeve to a predetermined pressure to compensate for load changes on the vehicle, said sleeve having crossed reinforcing cords therein formed at an angle greater than 40° when the pressure in said sleeve is below 15 psi, said sleeve cords increasing in angular relationship as the pressure in said sleeve is increasing to cause said sleeve length to foreshorten in response to load changes to compensate for front spring deflection so as to maintain the front of the vehicle parallel to ground.

3. A vehicle leveling system for maintaining a predetermined height relationship between the sprung and unsprung mass portions at the rear of a vehicle comprising: a vehicle frame cross member directed generally perpendicularly to the longitudinal axis of the vehicle and including end portions thereon, side frame members connected to each of the end portions of said cross member, rear spring means supporting said cross member at the end portions thereof, said cross member including a fowardly located seat portion thereon offset from the midportion of said cross member, a differential housing located below said cross member including side support means thereon underlying said forwardly located seat portion on said cross member, a first air spring piston connected to said cross member seat portion, a second air spring piston connected to a side portion of said differential housing support surface, each of said pistons having a bell-shaped outer surface, a tubular sleeve connected between each of said pistons including a rolling lobe on each end thereof supportingly received on each of said bell-shaped piston surfaces, each of said rolling lobes being sealingly secured to said pistons to form a pressurizable air chamber within said sleeve between said first and second piston members, said sleeve having a length between said pistons greater than the diameter of said sleeve to define a spring column having reduced lateral stiffness whereby the spring will follow suspension motion between said cross member seat and said differential support means, said first and second pistons and said sleeve lobes supported thereon adjusting to relative movement between said cross member seat and said differential support member to maintain a columnar force reaction on said piston between said cross member support seat and said differential housing support means, pressurizable air supply means, means for automatically controlling flow of air from said pressurizable air supply means into said sleeve for inflating said sleeve to a predetermined pressure to compensate for load changes on the vehicle.

4. A vehicle rear suspension leveling system comprising: a rear axle housing, wheel means on said rear axle housing for supporting said axle housing, a vehicle frame including side members and a cross member, said cross member including rearwardly directed spring seats on either side thereof, a forwardly directed spring seat located intermediate said rearwardly located spring seats and offset from the longitudinal center of said cross member, spaced apart spring seats on said axle housing, first and second spring means interposed between said rearwardly directed frame spring seats and said axle housing spring seats for supporting said frame a predetermined trim height above said axle housing, a differential housing on said axle housing intermediate the ends thereof, said differential housing having a longitudinal surface defining a pinion bumper support surface thereon, a pinion bumper at the midpoint of said cross member operative to engage said support surface to control movement of said cross arm upon maximum compression of said first and second springs, a spring seat on one side of said differential housing at the nose thereof located in offset relationship to said pinion bumper support surface, a cylindrical air spring connected between said forwardly directed spring seat and said differential housing spring seat, said air spring including a pair of spaced apart piston members and an elongated sleeve to form a column support between said differential housing and said cross member, said air spring sleeve having rolling lobes thereon fastened to said pistons for defining a pressurizable air chamber, means for supplying air to said air spring and for exhausting air therefrom to produce a supplemental load carrying suppprt in addition to said springs for leveling load changes on said vehicle frame, said air spring compensating for changes in the loading to maintain vertical clearance between said cross member and differential housing whereby the length of said pinion bumper can be foreshortened, said air spring having a length to diameter ratio to maintain a substantial longitudinal spring rate and a reduced lateral spring rate whereby the spring is stable to support changes in load and able to follow the suspension movement between said cross member and said differential housing without undue strain on the air spring.

5. A vehicle suspension system comprising: front suspension means including spring means for supporting the vehicle weight of the front thereof, a rear axle housing, wheel means on said rear axle housing for supporting said axle housing, a vehicle frame including side members and a cross member, said cross member including rearwardly directed spring seats on either side thereof, a forwardly directed spring seat located intermediate said rearwardly located spring seats, spaced apart spring seats on said axle housing, first and second spring means interposed between said rearwardly directed frame spring seats and said axle housing spring seats for supporting said frame a predetermined trim height above said axle housing, a differential housing on said axle housing intermediate the ends thereof, said differential housing having a longitudinal surface defining a pinion bumper support surface thereon, a pinion bumper at the midpoint of said cross member operative to engage said support surface to control movement of said cross member upon maximum compression of said first and second springs, a spring seat on one side of said differential housing at the nose thereof located in offset relationship to said pinion bumper support surface, an air spring connected between said forwardly directed spring seat and said differential housing spring seat, said air spring including a pair of spaced apart piston members and an elongated sleeve to form a column support between said spring seat on one side of said differential housing and said cross member, said air spring sleeve having rolling lobes thereon fastened to said pistons for defining a pressurizable air chamber, means for supplying air to said air spring and for exhausting air therefrom to vary the height thereof and to produce a supplemental load carrying support in addition to said springs for leveling load changes on said vehicle frame, said air spring conpensating for changes in the loading to maintain vertical clearance between said cross member and differential housing whereby the length of said pinion bumper can be foreshortened, said air spring having a length to diameter ratio to maintain a substantial longitudinal spring rate and a reduced lateral spring rate whereby the spring is stable to support changes in load and able to follow the suspension movement between said cross member and said differential housing without undue strain on the air spring, said sleeve being made of reinforced rubber with layers of cord fabric crossed at an angle adjusted to cause the diametral growth of the sleeve on pressurization of the spring sleeve to match front suspension deflection so as to maintain the front of the vehicle parallel to ground.

6. In a vehicle rear suspension leveling system a differential housing having a longitudinally projecting nose portion, differential gear means within said housing including a pinion member, cam means on said pinion member, a drive shaft extending from said differential housing adapted to be connected to power output means for driving said gear means to transfer power from the output means, pump means including an outer case, means supporting said case on one side of said nose portion means forming a port in said housing, means including a driven member in said pump case for compressing air, said driven member extending through said port into operative engagement with said cam means to operate said driven member only when a vehicle is driven, a cylindrical air spring connected between an offset portion of a vehicle frame cross member and the other side of said nose portion, means to direct air from said pump means to said air spring to produce a spring force supplemental to that of primary vehicle spring means, and means for automatically controlling air flow from said pump means to said spring for maintaining a predetermined height relationship between said chassis cross member and said axle housing in response to changes in vehicle load.

7. In a leveling system for a vehicle, a differential, first and second axle means extending in opposite directions laterally from said differential, a centralized housing for said differential, axle housing means for each of said axle means extending laterally from said differential housing, a wheel assembly disposed at each end of said axle housing means, means drivingly connecting each said axle means to the associated wheel assembly at each end of said axle housing means, a pair of spaced main spring seats secured at predetermined positions to said axle housing means, a vehicle chassis frame cross member spaced above said axle housing means and said differential housing, said cross member having opposite end portions aligned with said main spring seats on said axle housing, first main spring means having a first spring rate operatively disposed between a first of said spring seats and said aligned end portion of said cross member, second main spring means having a spring rate less than the spring rate of said first spring means operatively disposed between the second of said spring seats and the aligned end portion of said cross member, said differential housing having a nose portion which projects longitudinally with respect to said laterally extending axle housing means, said differential including an input gear means, drive shaft means drivingly connected to said input gear means, air compressor means secured on one side of said nose portion, said air compressor means including actuator means operated by said gear means to compress air, tubular air spring means having a variable height operatively connected to said air compressor means having an upper and lower terminal ends to provide a variable spring force for raising and lowering said cross member with respect to said differential housing, means on the other side of said nose portion for mounting said air spring means to said differential housing, means offset from the center of said chassis frame cross member for securing the upper portion of said air spring means to said cross member so that said compressor means supplies compressed air to said air spring means when said vehicle is driven to produce a spring force supplemental to that of said main spring means for leveling said vehicle and for compensating for said differing spring rates of said main spring means and for urging said nose portion of said differential housing downwardly, and means for automatically controlling the air flow from said compressor means to said air spring means for maintaining a predetermined height relationship between said chassis frame cross member and said differential and axle housing means in response to changes in load on the vehicle.

* * * * *